US006874080B2

(12) United States Patent
Wishneusky

(10) Patent No.: US 6,874,080 B2
(45) Date of Patent: Mar. 29, 2005

(54) CONTEXT PROCESSING BY SUBSTANTIALLY SIMULTANEOUSLY SELECTING ADDRESS AND INSTRUCTION OF DIFFERENT CONTEXTS

(75) Inventor: John A. Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 09/989,483

(22) Filed: Nov. 19, 2001

(65) Prior Publication Data

US 2003/0097548 A1 May 22, 2003

(51) Int. Cl.[7] .............................................. G06F 9/48
(52) U.S. Cl. ..................... 712/228; 712/205; 712/214; 712/245; 718/108
(58) Field of Search ............................... 712/205, 214, 712/228, 245; 718/108

(56) References Cited

U.S. PATENT DOCUMENTS

| 4,975,828 | A | | 12/1990 | Wishneusky et al. | ........ 364/200 |
| 5,357,617 | A | * | 10/1994 | Davis et al. | ................ 712/245 |
| 5,724,565 | A | * | 3/1998 | Dubey et al. | ............... 712/245 |
| 5,872,985 | A | * | 2/1999 | Kimura | .......................... 710/1 |
| 6,092,180 | A | | 7/2000 | Anderson et al. | |
| 6,295,600 | B1 | * | 9/2001 | Parady | ....................... 712/228 |
| 6,594,755 | B1 | * | 7/2003 | Nuechterlein et al. | ...... 712/239 |
| 2003/0046517 | A1 | * | 3/2003 | Lauterbach | ................. 712/214 |

FOREIGN PATENT DOCUMENTS

EP        0 942 366        9/1999

OTHER PUBLICATIONS

Agarwal, et al., "Sparcle: An Evolutionary Processor Design for Large–Scale Multiprocessor", *IEEE Micro*, 13(3):48–61 (1993).
Li, Yamin, et al., "The Effects of STEF in Finely Parallel Multithread Processors", *IEEE International Symposium on High–Performance Computer Architecture*, pp. 318–325, Jan. 1995.
Loikkanen, et al., "A Fine–Grain Multithreading Superscalar Architecture", *IEEE Comp. Soc.*, pp. 163–168, Oct. 1996.
Thistle, et al., "A Processor Architecture for Horizon", *IEEE Proceedings Supercomputing*, pp. 35–41, Nov. 1988.

* cited by examiner

*Primary Examiner*—Kenneth S. Kim
(74) *Attorney, Agent, or Firm*—Fish & Richardson P.C.

(57) ABSTRACT

A processing system that executes multiple instruction contexts includes an instruction memory for storing instructions that are executed by the system, a processor unit executing the instructions in a pipelined fashion, a plurality of context registers for storing instructions and instruction addresses for contexts to be executed and fetch logic for selecting an address from one of the context registers and for selecting an instruction from a second of the context registers for execution substantially simultaneously for each cycle of execution of processor unit.

21 Claims, 2 Drawing Sheets

CONTEXT PROCESSING BY SUBSTANTIALLY SIMULTANEOUSLY SELECTING ADDRESS AND INSTRUCTION OF DIFFERENT CONTEXTS

BACKGROUND

This invention relates to scheduling contexts in a pipelined computer processor.

Instruction execution in a computer processor may be accomplished in a variety of ways. For example, a software program that includes multiple instructions may be partitioned into multiple sets of instructions ("contexts") where each context may be "swapped" in or out of execution according to a scheduling system associated with the processor.

DESCRIPTION

A computer processor may execute individual instructions within a context in a pipelined fashion ("pipelining"). That is, individual instructions are executed in multiple pipeline stages that relate to different logic blocks within the processor. Pipelining often causes data dependencies, where a first instruction is modifying data that is required by a subsequent instruction, and which may cause the computer processor to stall waiting for the data to become available. Furthermore, pipelined execution of conditional instructions, i.e., instructions that can alter the sequential execution of instructions, (e.g., branches and subroutines) may cause the wrong instructions to be fetched. Scheduling of context execution in a pipelined processor affects the availability of computer processor resources and overall processor performance.

Figure 1:
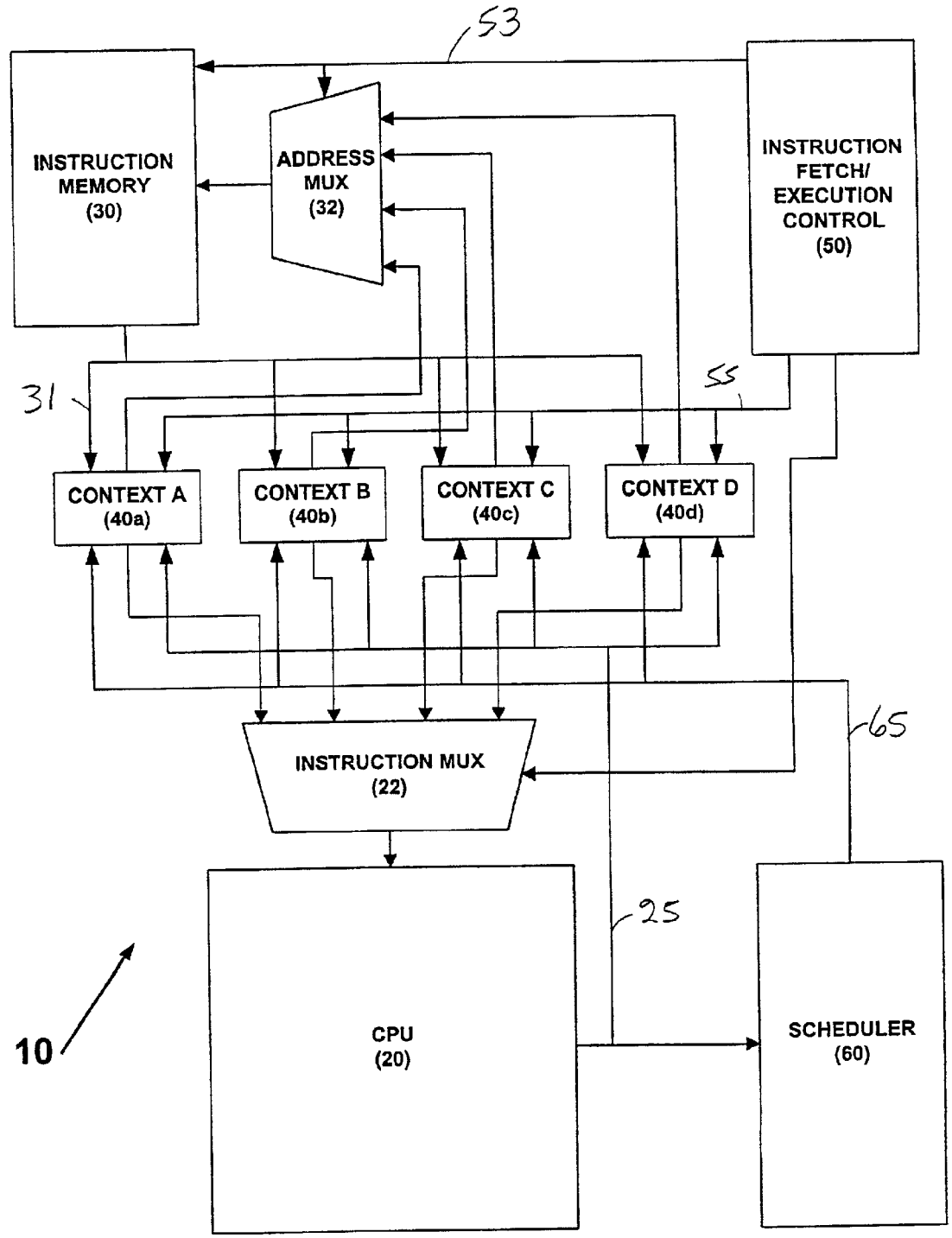
FIG. 1 shows a block diagram of a pipelined processor system that executes multiple contexts.

Referring to FIG. 1, a computer processing system 10 that executes multiple contexts includes a computer processing unit (CPU) 20 that executes instructions in a pipelined fashion, an instruction memory 30 for holding instructions to be executed by CPU 20 and a set of executing context registers (ECR) 40a–40d for holding context information for contexts that have been scheduled for execution. ECR 40a–40d are storage "registers", each storing an instruction address for the next instruction to be executed by each context, respectively. System 10 also includes an instruction fetch/execution control block 50 ("control block 50") for selecting instruction addresses from ECR 40a–40d that are input to instruction memory 30 and for selecting instructions from ECR 40a–40d that are input to CPU 20. System 10 also includes a context scheduler 60 that is connected to ECR 40a–40d by new context bus 65. Context scheduler 60 stores context information in ECR 40a–40d for contexts determined ready for execution by scheduler 60, as will be explained.

CPU 20 is connected to send control information 25 related to the execution of previous instructions to each of ECR 40a–40d. Control information 25 may include an indication that a context "exit" instruction was executed, or an indication of the execution of a conditional instruction, or the computed instruction address from a previously executed conditional instruction. Control information bus 25 is also connected to scheduler 60 to indicate the execution of a context exit instruction.

System 10 executes up to four (4) contexts concurrently, executing a single instruction in sequence from each context in ECR 40a–40d. Control signals 55 from control block 50 to ECR 40a–40d selects one instruction from each context every fourth execution cycle of CPU 20. By executing only a single instruction from each context 40a–40d, respectively, all of the pipeline stages of each instruction are able to complete before the execution of any subsequent instructions in the same context 40a–40d, respectively.

Therefore, "results" from the execution of a first instruction in a context will be available before a second instruction in the same context might reference those results. The results may include, for example, an ALU computation, a completion of a data read and a completion of a data write. Also, the results may include instruction-fetching decisions, for example, a computed address for a branch or subroutine instruction. The computed address is used to fetch the "correct" instructions, that is, avoiding the sequential fetching of instructions that may not need to be executed.

ECR 40a–40d are connected to receive a computed address from CPU 20 on control information bus 25 and also connected to receive an initial instruction address for new contexts to be executed on bus 65 from scheduler 60. ECR 40a–40d also store the actual instruction for execution, after the instruction is loaded from instruction memory 30 on instruction bus 31. ECR 40a–40d may also store additional information relating to the execution state required to resume execution of the stored instruction by CPU 20, e.g., CPU state and register values required to properly resume execution of a context.

In operation, at system start-up, context scheduler 60 loads an instruction address into each ECR 40a–40d on bus 65. Thereafter, during operation, whenever an ECR 40a–40d becomes available, context scheduler 60 loads another instruction address for another context determined ready for execution. In a multiple context execution system, such as system 10, contexts eventually complete and must be 'de-scheduled'. In system 10 de-scheduling occurs upon execution of a 'context exit' instruction contained within a context.

However, in order to avoid the fetching of instructions for the context containing the context exit instruction, the context exit instruction must be recognized by CPU 20 and indicated to scheduler 60. More specifically, when a context exit instruction is executed by CPU 20 control information is sent on bus 25 to scheduler 60 to indicate the completion of a context and the availability of an ECR 40a–40d. In response, scheduler 60 will cause a new instruction address for a new context to be loaded into the available ECR 40a–40d. Many scheduling schemes can be used to determine when a new context is ready for execution.

Control logic 50 operates as a "distributor" of selection counts and timing pulses. That is, control logic 50 distributes values from a repeating selection counter and a timing pulse, on output lines 55, 53 and 51, to each of ECR 40a–40d, address mux 32 and instruction mux 22, respectively. More specifically, control logic 50 outputs a selection count to each of address mux 32, instruction mux 22 and each of ECR 40a–40d in a repetitive "control cycle".

For example, during a first "control cycle", control logic 50 outputs a selection count 53 that selects the instruction address from ECR 40a being input to address mux 32 causing an output of an instruction from instruction memory 30 that is stored in ECR 40a. During the same control cycle, control logic 50 also outputs a selection count 51 that selects an instruction from instruction mux 22 from ECR 40b that causes the input of the selected instruction to CPU 20. Also, during the same control cycle, control logic 50 outputs a selection count to ECR 40d to load control information 25 caused by a previously executed instruction from the context of ECR 40d. During the next control cycle, control logic 50 will increment the selection counts on lines 55, 53 and 51 to repeat the sequence of loading instructions, addresses and control information to and from ECR 40a–40d.

The use of four (4) ECR 40a–40d in system 10, and the sequential selection of each ECR 40a–40d in a round-robin fashion by control block 50 allows enough time between instruction execution of each context for control information to be available from a previous instruction executed by CPU 20. However, other numbers of ECRs could be used to provide more or less time between instruction execution and to accommodate more or less pipeline execution over-lap in CPU 20.

System 10 operates most efficiently with software applications that are readily partitioned into multiple contexts, for example, network processing applications each of which interact with different hardware blocks or interfaces connected to system 10, or the like. Therefore, applications that allow the scheduling of four (4) contexts will maximize the use of available processing cycles of CPU 20. However, even applications that allow less than four (4) contexts to be concurrently scheduled will still be able to gain some efficiency in a pipelined CPU 20, that is, since each instruction executed in system 10 in a round-robin fashion may still be provided with additional time for the control information 25 to become available from a first instruction before execution of a subsequent instruction.

A known way of handling data dependencies issues in a pipelined processor is to provide a "bypass bus" and associated control logic. The bypass bus is a data bypass line from the output to the input of an arithmetic logic unit that is used to provide data modified by a first instruction directly to the input of the ALU for used by a subsequent instruction requiring the data. In an integrated processor, including a bypass bus and associated control logic adds complexity to the design and occupies logic area that could be used for other purposes. By contrast, in system 10, the context scheduling and execution control allows for a far simpler CPU design, i.e., a CPU that does not require an ALU bypass bus and associated logic. More specifically, in system 10, ALU and register operations for a first instruction executed in CPU 20 will complete and data will be available before a second instruction in the same context requires the data.

As described previously, CPU 20 does not require an ALU bypass bus and associated bypassing logic to deal with pipelining issues relating to data dependencies or conditional instruction execution. However, CPU 20 could include these features.

Figure 2:
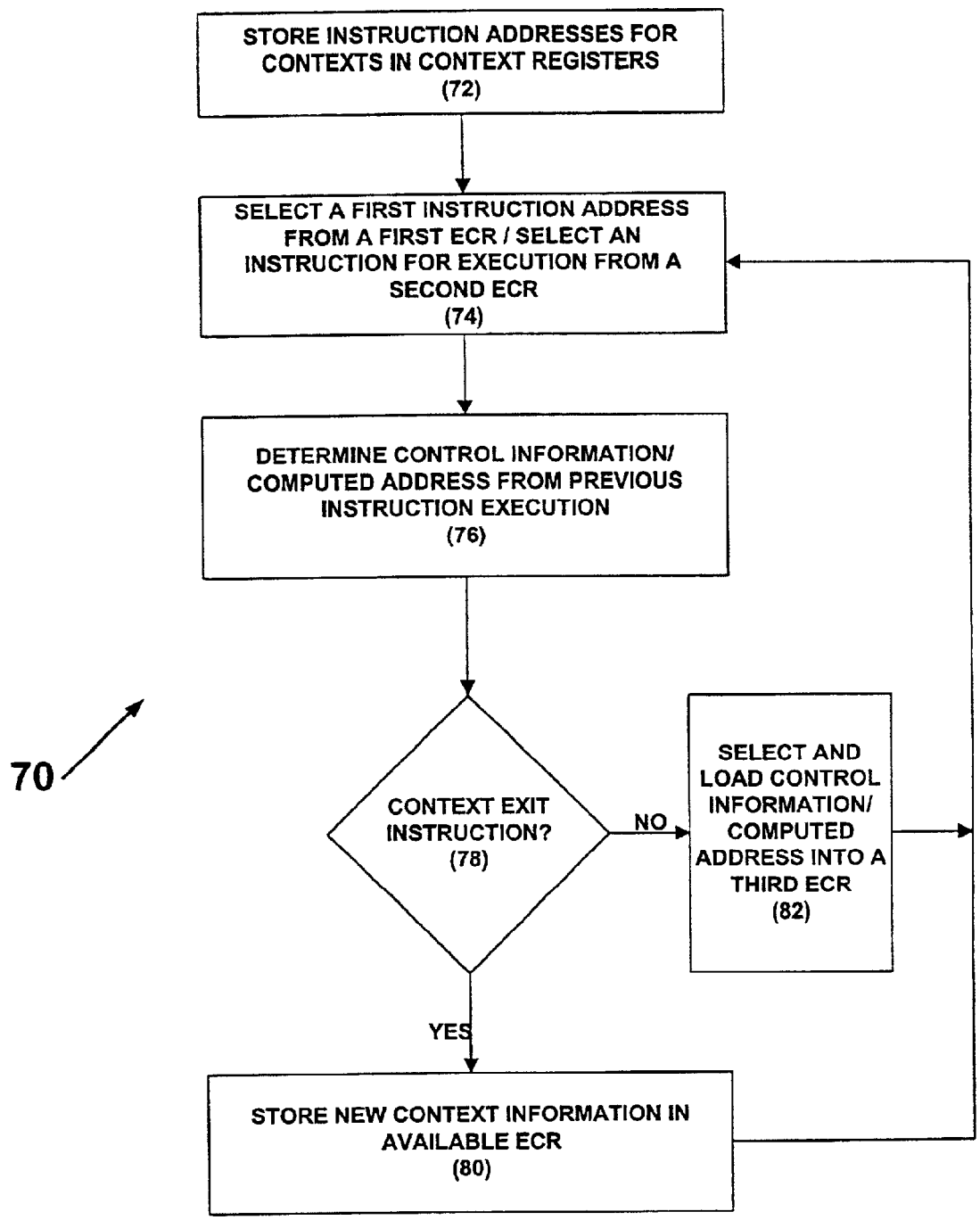
FIG. 2 is a flowchart that depicts a process for executing multiple contexts.

Referring to FIG. 2, a process 70 of executing multiple contexts in a computer processor includes storing 72 instruction addresses for contexts ready for execution in execution context registers (ECRs). The process 70 selects 74 a first instruction address from a first ECR and selects 74 an instruction for execution from a second ECR in the same execution cycle. The process 70 determines 76 control information and/or a computed address from a previous instruction execution, and determines 78 whether the previous instruction was a 'context exit' instruction. If the previous instruction was a context exit, process 70 includes storing 80 a new context for execution in an available ECR and repeating the sequence of actions 74–78 for other contexts stored in the ECRs. If the previous instruction was not a context exit, process 70 includes selecting and loading 82 the control information and/or the computed address into a third ECR, and repeating the sequence of actions 74–78 for other contexts stored in the ECRs.

In an embodiment, process 70 is implemented in a computer program that includes instructions that are executed by a computer processor.

A number of embodiments of the invention have been described. Other embodiments are within the scope of the following claims.

What is claimed is:

1. A processing system that executes multiple instruction contexts comprising:
    an instruction memory for storing instructions that are executed by the system;
    a processor unit for executing instructions in a pipelined fashion;
    a plurality of context registers for storing instructions and instruction addresses for contexts awaiting execution; and
    fetch logic for selecting an address from one of said plurality of context registers and for selecting an instruction from a second of said plurality of context:resisters for execution by said processor unit, with the fetch logic selecting the address and the instruction substantially simultaneously for a first cycle of execution of said processor unit.

2. The system of claim 1 wherein said processor unit outputs control information related to the execution of an instruction, and said fetch logic selects a third of said plurality of context registers for input of the control information substantially simultaneously with the selection of the address and the instruction in each cycle of execution of said processor unit.

3. The system of claim 2 wherein the fetch logic selects a different one of said plurality context registers in a round robin manner during each corresponding, successive cycle of execution of said processor.

4. The system of claim 3 wherein the control information includes an indication that a branch instruction was executed by a previous context and the control information also including an instruction address of a branch taken.

5. The system of claim 3 wherein the control information includes an indication that a branch instruction was executed by a previous context and the control information also including an instruction address of a branch not taken.

6. The system of claim 3 wherein the control information includes an indication that a subroutine instruction was executed by a previous context and the control information includes an instruction address of subroutine.

7. The system of claim 4 further comprises:
    scheduling logic that schedules execution of the contexts by storing an instruction address for a context ready for execution in an available one of said plurality of context registers.

8. The system of claim 7 wherein the control information is also input to said scheduling logic, the control information including an indication that a context exit instruction was executed by a first context.

9. The system of claim 8 wherein said scheduling logic stores a context instruction address for a second context into an available one of said plurality of context registers based on the indication that a context exit instruction was executed by the first context.

10. A method of operating a processing system, the method comprising:
  scheduling a plurality of contexts to be executed by said system, said scheduling comprises:
  storing an instruction address for each of said plurality of contexts in a corresponding one of a plurality of context registers;
  selecting a first instruction address from a first of said plurality of context registers and an instruction from a second of said plurality of context registers in a first cycle of execution of the system; and
  selecting a second instruction address from the second of said plurality of registers and a different instruction from a third of said plurality of registers in a second cycle of execution of the system.

11. The method of claim 10 further comprises:
  storing control information in one of said plurality of context registers in each cycle of execution of the system.

12. The method of claim 11 further comprises:
  determining a branch taken instruction address based on the execution of a previous instruction by the system; and
  storing the branch taken address in one of the plurality of context registers.

13. The method of claim 11 further comprises:
  determining a branch not taken instruction address based on the execution of a previous instruction by the system; and
  storing the branch not taken instruction address in one of the plurality of context registers.

14. The method of claim 11 further comprises:
  determining a subroutine instruction address based on the execution of a previous instruction by said system; and
  storing the subroutine address in one the plurality of context registers.

15. The method of claim 11 wherein said scheduling further comprises:
  determining that a context exit instruction was executed from a first one of said context registers;
  storing an instruction address for a new context in the first one of said context registers.

16. A computer program stored in a computer readable medium having instructions causing a computer that executes multiple contexts to:
  store an instruction address in each of a plurality of context registers;
  load a first instruction corresponding to a first instruction address stored in one of the plurality of context registers;
  select the first instruction for execution in a first cycle of execution of said computer; and
  load a second instruction corresponding to a second instruction address stored in a second of the plurality of context registers substantially simultaneously with the selection of the first instruction.

17. The computer program of claim 16 further comprising instruction causing a computer that executes multiple contexts to:
  determine control information related to the execution of a previous instruction in each cycle of execution of the computer; and
  store the control information in a one of the plurality of context registers substantially simultaneously with the selection of the first instruction.

18. The computer program of claim 17 further comprising instructions causing a computer that executes multiple contexts to:
  determine whether a branch is taken as the result of the execution of the previous instruction; and
  store a branch taken instruction address in one of the plurality of context registers.

19. The computer program of claim 17 further comprising instructions causing a computer that executes multiple contexts to:
  determine whether a branch is not taken as the result of the execution of the previous instruction; and
  store a branch not taken instruction address in one of the plurality of context registers.

20. The computer program of claim 17 further comprising instructions causing a computer that executes multiple contexts to:
  determine a subroutine address as the result of the execution of the previous instruction; and
  store the subroutine address in one of the plurality of context registers.

21. The computer program of claim 17 further comprising instructions causing a computer that executes multiple contexts to:
  determine whether the previous instruction from a first one of the plurality of context registers was a context exit instruction; and
  store a new context instruction address in the first one of the plurality of context registers.

* * * * *